United States Patent

Harvey

[15] 3,668,992
[45] June 13, 1972

[54] LENS HOUSING SUPPORT LINKAGE FOR BELLOWS TYPE CAMERAS

[72] Inventor: Donald M. Harvey, Rochester, N.Y.
[73] Assignee: Eastman Kodak Company, Rochester, N.Y.
[22] Filed: May 1, 1970
[21] Appl. No.: 33,679

[52] U.S. Cl. ..............................................95/39
[51] Int. Cl. ............................................G03b 17/04
[58] Field of Search.................................95/39; 220/8

[56] References Cited

UNITED STATES PATENTS

| | | |
|---|---|---|
| 1,939,203 | 12/1933 | Christie ..............................95/39 |
| 2,143,385 | 1/1939 | Platt ..................................95/39 |
| 2,143,125 | 1/1939 | Headlee ............................95/39 |
| 582,995 | 5/1897 | French ..............................95/39 |
| 713,597 | 11/1902 | Brownell ..........................95/39 |

FOREIGN PATENTS OR APPLICATIONS

| 150,354 | 6/1903 | Germany ..........................95/39 |
|---|---|---|

Primary Examiner—Samuel S. Matthews
Assistant Examiner—Russell E. Adams, Jr.
Attorney—Robert W. Hampton and J. Addison Mathews

[57] ABSTRACT

A linkage for supporting an extendable lens housing of a bellows type camera includes two identical link assemblies comprising link bars maintained in symmetrical relation to each other by meshed spur gear segments. The compactness afforded by the subject linkage construction allows the linkage to be concealed within the camera bellows without sacrificing the accuracy with which the lens housing is maintained in parallelism with the camera body member.

4 Claims, 4 Drawing Figures

PATENTED JUN 13 1972 3,668,992

DONALD M. HARVEY
INVENTOR.

BY *J. Addison Mathews*

*Robert W. Hampton*

ATTORNEYS 3,668,992

LENS HOUSING SUPPORT LINKAGE FOR BELLOWS TYPE CAMERAS

BACKGROUND OF THE INVENTION

1. Field of the Invention

The present invention relates to photographic cameras and more particularly to linkages for supporting an extendable lens housing of a bellows type camera.

2. Description of the Prior Art

Many types of linkages have been devised in the past for supporting an extendable lens housing of bellows type cameras in parallel relation to the camera body member so that the lens axis remains always at right angles to the film plane within the body member. To achieve the required accuracy and rigidity, previously known linkages of this type have usually been too large to be accommodated within the bellows of a conventional camera and have therefore been located externally of the bellows. However, since such a linkage is not particularly attractive, it obviously would be preferable to conceal it within the bellows, thereby not only enhancing the appearance of the camera but also eliminating the need to polish or plate the linkage components.

SUMMARY OF THE INVENTION

In accordance with the present invention a linkage for supporting an extendable lens housing of a bellows type camera in parallel relation to the camera body member comprises two substantially identical link assemblies which are preferably located within the camera bellows at opposite sides of the center axis thereof. Each such assembly includes four similar overlapping link bars made of flat metal or some other rigid material. The two rearward link bars of such assembly are pivotally connected to the camera body in crossed relation to each other and are provided with meshing spur gear segments which cause them to pivot in unison in opposite directions. The two corresponding forward link bars are pivotally supported in the same manner to the lens housing and are likewise provided with meshing spur gear segments. The end of each rearward link bar opposite the gear segment thereof is pivotally connected to the corresponding end of the opposite forward link bar, thus coordinating the movement of all the bars comprising that link assembly and maintaining their respective pivot points in rectilinear relation to each other. Abutment means associated with the link bars allow both link assemblies to be extended to the same predetermined maximum length to establish the extended position of the lens housing. The link bars comprising each link assembly are located in staggered relation to each other so that all four bars can overlap each other, thereby allowing the retracted linkage to be very compact. This construction therefore allows such a linkage to be concealed within the camera bellows without sacrificing the accuracy and rigidity with which the lens housing is maintained in parallelism with the camera body.

Various means for practicing the invention and other advantages and novel features thereof will be apparent from the following detailed description of an illustrative preferred embodiment of the invention, reference being made to the accompanying drawings in which like reference numerals denote like elements.

DESCRIPTION OF THE ILLUSTRATIVE PREFERRED EMBODIMENT

Figure 1:
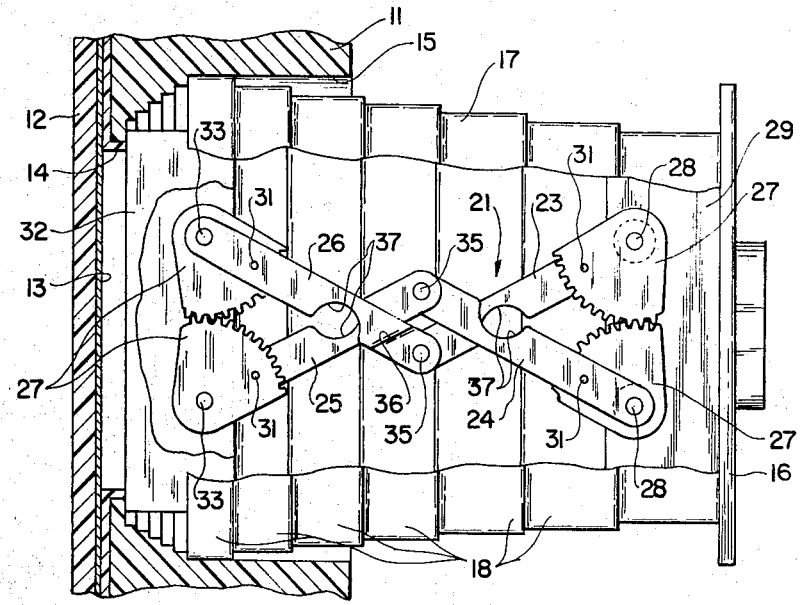
FIG. 1 is a fragmentary partially cross sectioned side elevational view of a camera provided with an illustrative lens housing support linkage located within the camera bellows, which is shown fully extended and partially broken away to depict details of the illustrative linkage.

The illustrative camera depicted somewhat schematically in the accompanying drawings comprises a body member 11 provided with a rear wall member 12 which supports the exposure area of a strip of film 13 in a flat plane behind a rectangular exposure window 14 located within recess 15 of the body member. The lens support housing 16, which carries the camera lens and shutter, not shown, is movable between an extended position illustrated in FIGS. 1 and 2 and a retracted position, depicted in FIGS. 3 and 4, in which it is received within body member recess 15.

Figure 3:
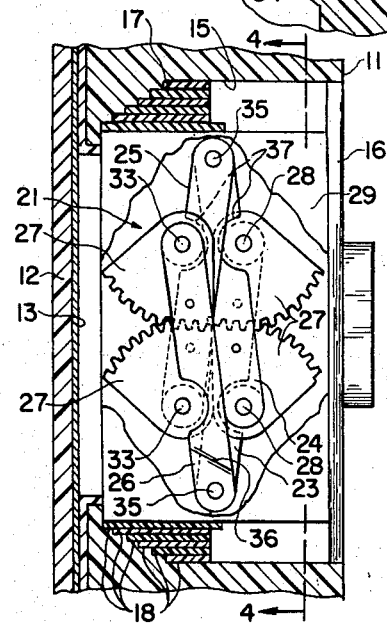
FIG. 3 is a fragmentary side elevational view corresponding to FIG. 1 but depicting the bellows and the support linkage in retracted condition.
Figure 4:
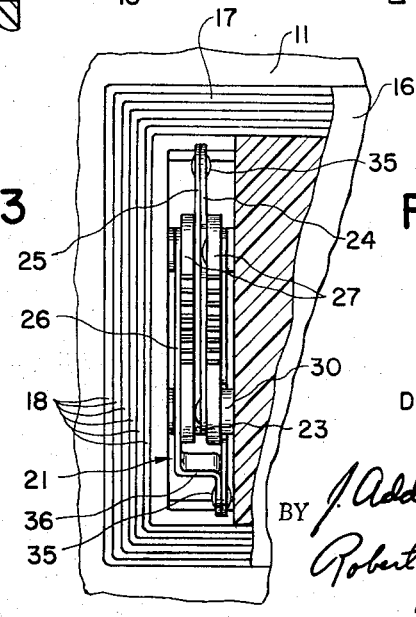
FIG. 4 is a fragmentary cross sectional end elevational view taken along line 4—4 of FIG. 3.

The illustrative camera bellows 17 is of the type described in commonly assigned copending U.S. Pat. Application Ser. No. 33,678, entitled "Molded Plastic Bellows," filed in my name on May 5, 1970, comprising a plurality of telescoping tubular sections 18 joined by appropriate light sealing means which also prevent the bellows sections from separating. The largest and smallest telescoping bellows sections are attached respectively to the camera body and to the lens housing, thereby preventing light from reaching the film except through the lens. When the lens housing is retracted, the bellows sections are telescoped into each other within body member recess 15, as shown in FIG. 3. Although this type of bellows has a number of advantageous features as explained in detail in the above-identified patent application, it should be understood that the lens housing support linkage with which the present invention is concerned is equally suitable for use in association with other more conventional types of bellows.

The subject support linkage comprises two identical link assemblies 21 and 22 which are located within the camera bellows at opposite sides of the lens axis in parallel opposed alignment with each other. Each link assembly comprises three identical flat link bars 23, 24 and 25, a similar fourth link bar 26 and four identical spur gear segments 27. The two link bars 23 and 24 comprising the forward pair of bars in each assembly are provided with pivot shafts 28 extending through the gear axis holes of the corresponding gear segments and are pivotally carried by support webs 29 of the lens housing. A washer 30 is provided between web 29 and the gear segment connected to each of the corresponding link bars 24 to maintain parallelism between link bars 24 and the other link bars. Pins 31 prevent relative pivotal movement between bars 23 and 24 and the corresponding gear segments, which therefore maintain those bars at all times in symmetrical crossed relation to each other. The two link bars 25 and 26 comprising the rearward pair of bars of each assembly are similarly supported for pivotal movement to internal walls 32 of the camera body member by pivot rivets 33 extending through spacer washers 34. The two gear segments associated with link bars 25 and 26 are likewise meshed with each other and are similarly pinned to those two bars so that the latter pivot in unison in opposite directions.

The end of each rearward link bar opposite the gear segment thereof is pivotally connected to the corresponding end of the opposite forward link bar of a hinge rivet 35, thus coordinating the movement of all of the bars of each link assembly and maintaining their respective pivot points in rectilinear relation to each other.

Figure 2:
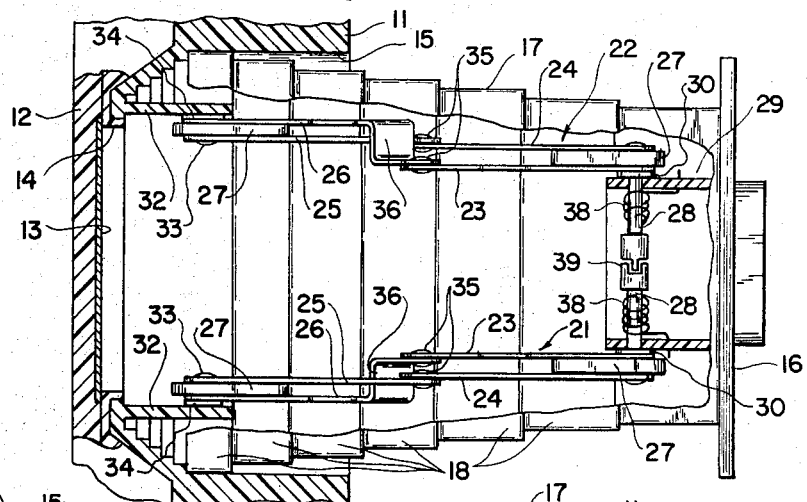
FIG. 2 is a plan view of the camera structure shown in FIG. 1 in which the camera and bellows structures are similarly illustrated partially broken away and cross sectioned.

As best shown in FIG. 2, the two outermost link bars 26 are bent to provide transverse portions 36 which allow those bars to be connected with the corresponding innermost forward link bars 23. Accordingly, all four bars are located in different planes and can overlap each other to permit the linkage to be retracted as illustrated in FIG. 3. To afford maximum compactness of the retracted linkage assembly, each bar is provided with an edge notch 37 adapted to accommodate the respective washer adjacent the pivot means by which the opposite bar of the same pair is supported to the camera structure.

The fully extended position of the linkage is defined by the abutment of the bent portions 36 of link bars 26 with the adjacent edges of the corresponding link bars 25 as shown in FIG. 1; thereby insuring that the lens assembly is located in parallel relation to the film place at a predetermined fixed distance therefrom. Coil springs 38 encircling pivot shafts 28 apply resilient torque to those shafts to bias the lens housing to its fully extended position, from which it can be moved manually to its retracted position where it is engaged by a releasable latch device, not shown.

Since both link assemblies have the same extended length, they need not necessarily move precisely in unison with each other to insure parallelism between the extended lens housing and the film plane. It is advantageous, however, that the movement of both link assemblies be coordinated to prevent twisting of the linkage, which can readily be accomplished by connecting both such assemblies to a common pivot shaft carried by the lens housing. Alternatively, two of the illustrated opposed pivot shafts 28 can be connected to each other by means of a dog type coupling 39, which provides the further advantage of affording a limited amount of rotational freedom between those two shafts to avoid possible binding resulting from dimensional inaccuracies in the link assemblies.

Because it utilizes a plurality of identical reversible components, the subject lens housing support linkage is obviously very inexpensive to produce, particularly since those components need not be finished if they are concealed within the camera bellows. Furthermore, the meshed gear segment arrangement employed in the subject linkage provides very accurate parallelism and rigidity by providing a relatively small ratio between the transverse and longitudinal dimensions of the imaginary rectangle defined by the four end pivot points of each link assembly.

The invention has been described in detail with particular reference to an illustrative preferred embodiment thereof, but it will be understood that variations and modifications can be effected within the spirit and scope of the invention.

I claim:

1. A photographic camera for exposing film, said camera comprising: a body member for receiving the film; a lens housing carrying a lens for effecting exposure of the film; a collapsible bellows extending between said body member and said lens housing for establishing a light-tight chamber between said body member and said lens housing; and an extendable and retractable support linkage within said light-tight chamber for movably supporting said lens housing in parallel relation to said body member, said support linkage comprising two substantially identical link assemblies located in opposed parallel relation relative to each other, each of said link assemblies including:

a. two rearward link bars pivotally supported at their rearward ends to said body member by respective first pivot means for locating said rearward ends in spaced relation relative to each other,
   b. two meshing first gear segments one each attached to corresponding ones of said rearward link bars in concentric relation to said first pivot means, said meshing first gear segments maintaining said rearward link bars in crossed relation relative to each other,
   c. two forward link bars pivotally supported at their forward ends to said lens housing by respective second pivot means for locating said forward ends in spaced relation relative to each other, one each of said forward link bars corresponding to one each of said rearward link bars,
   d. two meshing second gear segments one each attached to corresponding ones of said forward link bars in concentric relation to said second pivot means, said meshing second gear segments maintaining said forward link bars in crossed relation relative to each other, and
   e. hinge means pivotally connecting the forward end of each of said rearward link bars with the rearward end of its corresponding forward link bar;

said substantially identical link assemblies being coupled together for positive coordinated movement by a substantially rigid shaft extending between and immovably fixed to at least one of said two second meshing gear segments of each of said link assemblies.

2. The invention defined by claim 1 in which each of said link assemblies comprises three substantially identical flat link bars and one bent link bar.

3. The invention defined by claim 2 in which each of said bent link bars defines two parallel legs and a bent portion extending transversely of said legs, said bent portion being engagable by another one of said link bars in crossed relation thereto to limit the maximum extension of said bellows.

4. The invention defined by claim 3 in which said link bars include edge notch means for accommodating said pivot means when said bellows is in its fully retracted condition.

* * * * *